United States Patent

[11] 3,613,627

| | | |
|---|---|---|
| [72] | Inventor | Paul B. Kennedy<br>Bellevue, Wash. |
| [21] | Appl. No. | 46,189 |
| [22] | Filed | June 15, 1970 |
| [45] | Patented | Oct. 19, 1971 |
| [73] | Assignee | The Boeing Company<br>Seattle, Wash. |

[54] HIGH SPEED FAIRED TOWING CABLE
8 Claims, 6 Drawing Figs.

[52] U.S. Cl. .................................................. 114/235 F,
174/101.5
[51] Int. Cl. .................................................. B63b 21/00,
H01b 7/12
[50] Field of Search .......................................... 114/235 F;
174/101.5

[56] References Cited
UNITED STATES PATENTS

| | | | | |
|---|---|---|---|---|
| 3,304,364 | 2/1967 | Hetherington | | 114/235 F X |
| 3,443,020 | 5/1969 | Loshigan | | 114/235 F X |

Primary Examiner—Trygve M. Blix
Attorneys—Glenn Orlob and Nicholaas De Vogel

ABSTRACT: A low-drag underwater towing cable having a high stability at high towing speeds. The cable comprises an elongated hydrofoil-shaped structure with a leading edge made from continuous unidirectional glass fibers bonded together and a trailing edge made from flexible material such as plastic, rubber, or the like. An elastomer impregnated cross-woven material covers and encloses the leading and trailing edge portions. Braided electrical conductors are led through the trailing edge at a predetermined location nearest the leading edge for preventing tension forces and for avoiding interference with trailing edge yielding properties.

PATENTED OCT 19 1971 3,613,627
SHEET 1 OF 2
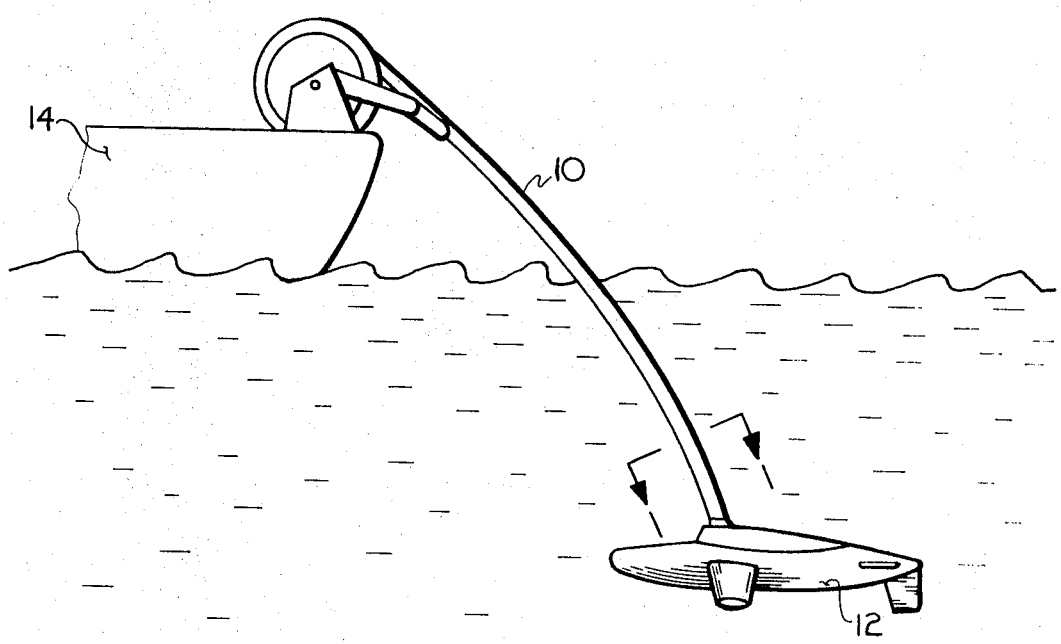
FIG 1
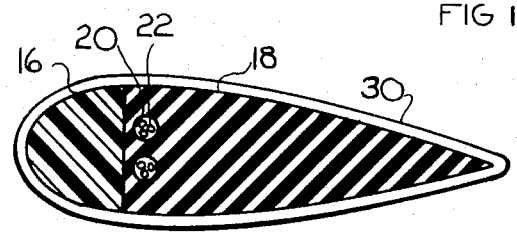
SECTION 1-1   FIG 2
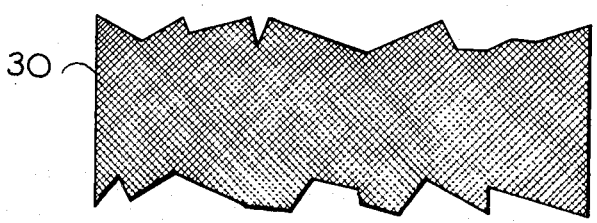
FIG 3
INVENTOR
PAUL B. KENNEDY
BY /s/ Nicolas Newose
AGENT $L_L = L_R$

INVENTOR
PAUL B. KENNEDY
BY
AGENT

HIGH SPEED FAIRED TOWING CABLE

BACKGROUND OF THE INVENTION

1. Field of the Invention

This invention relates to an underwater towing cable and more particularly to a streamlined, low-drag cable for towing an object underwater at high speed.

2. Description of the Prior Art

The underwater towing cable as disclosed herein is an improved version in the art of towing cables. Configurations and patents have been issued in this field and the closest approach to the present improvement invention was found in the U.S. Pat. No. 3,352,274 by CALKINS which high speed faired towing cable utilizes a novel concept of glass fiber material in its leading edge. The concept is limited because the existence of a coefficient of friction, even though small, will permit the trailing edge to pick up load and stretch in increasing amounts toward the center of the towline. In long towlines the elongation in the center area may equal that of the tension member. In such a case the center of tension may be affected adversely as will be explained later and the electrical conductors may be damaged as also explained later. Furthermore, it appears technically unfeasible to make permanent, reliable bonds between a low friction material, such as Teflon, and the tension member and fairing member materials.

DESCRIPTION OF THE INVENTION

The towing of underwater objects at significant depths and high speeds require a towline of lower drag than that afforded by unfaired round steel cables. Whenever sonar devices are to be towed the acoustic noise associated with the water turbulence and ventilation in the vicinity of and adjacent to such cables, reduces the sensitivity of the device by masking the signals to be detected. It is the purpose of this invention to provide a low-drag, low-noise, streamlined, high-strength towline for towing underwater objects at ranges of depths and speeds heretofore unattainable. It is also the purpose of this invention to provide a towline of considerably reduced complexity as compared to all previous designs.

High drag causes the towed object to stream out near the surface behind the towing vessels unless depressing forces are applied to cause the towed body to submerge. These depressing forces are usually applied by means of control surfaces on the towed body and the result of the drag and depressing forces is increased tension in the towline. Increased tension requires either a stronger towline of the same cross-sectional area or a larger cross-sectional area of the same material. Strength improvements in conventional steel cables commonly used have been minimal so the only recourse would be to enlarge the cable. Since drag is dependent upon frontal area of the towline, this approach results in increased drag which in turn would require additionally greater depressing forces. A practical limit is soon reached which, with unfaired towlines, prevents towing at other than low speeds and shallow depths. Such towlines are also noisy due to turbulence and ventilation.

Drag is also dependent upon the shape of the towline although to a lesser extent than its dependence upon frontal area. Because a streamlined airfoil, or hydrofoil, shape creates less drag than a round cable, many attempts have been made to solve the drag problem by attaching a fairing of such a shape to the steel cable. However, these attempts have met with little success because the drag was not reduced sufficiently to permit a smaller cable and in turn permit reduction of the frontal area. In fact, many designs increased the frontal area in applying the fairing and resulted in a net increase in drag.

Further, many attempts at fairing the larger diameter cables resulted in bulky fairings attached along the cable in segments in order to permit the cable to assume the near-catenary shape during towing and to permit winching onto a drum of reasonable diameter on deck. Such segmenting along with other protuberances, attachments and joints provided turbulence which resulted in excessive noise and contributed to higher drag. Had any of these previous attempts been towable at high speeds, the hydrofoil shapes chosen would produce cavitation in the region near the water surface with its attendant noise as well as its potential for damaging the fairing.

The bulk and complexity of some of the designs in the prior art cited are obvious. The required handling equipment on board ship is therefore bulky and in many cases complex. Considerable storage space is required for long lengths of such towlines and their fairings. Therefore, an ideal faired towline system for high speed towing at significant depths must possess minimum drag by virtue of a small frontal area, noncavitating, nonventilating, hydrodynamically efficient hydrofoil-shaped fairing enclosing a high strength (and therefore small) tension member. The fairing must be continuous with no joints, fasteners, or segmentation which would increase drag and noise. The trailing edge must be sharp to minimize drag and noise and electrical conductors should be led through the region of the foil in which they would least influence movement of the center of tension. It has been found that a location next to the high tensile strength leading edge and most forward of the flexible material trailing edge appears to be in between the leading edge center of tension and the hydrodynamic center.

In general, the present invention relates to a low-drag, high-speed towing cable for towing submerged objects. The towing cable has an elongated leading edge member and an elongated trailing edge member assembled continuously along a plane parallel to said towing cable elongate dimension to form an overall constant hydrofoil cross-sectional shape. The leading edge member is a composite material, including a resin with high tensile strength fibers running continuously parallel to the elongate dimension and the trailing edge is made from a flexible material having an elongated cavity for the accommodation of conductors at the region between the hydrodynamic center and the center of tension of the leading edge near or adjacent the leading edge plane. A material forming a skin about the leading edge and trailing edge having woven fiber material intersecting with the tow cable elongated dimension at 45° envelops the assembly.

IN THE DRAWINGS

FIG. 1 is a pictorial diagram of the typical environment for the cable of the present invention.

FIG. 2 is a cross-sectional view of the cable taken from FIG. 1 along line 2—2.

FIG. 3 is a view taken from the side of the cable which shows the surface or covering by the material enveloping the cable assembly.

DESCRIPTION OF THE INVENTION

Figure 4:
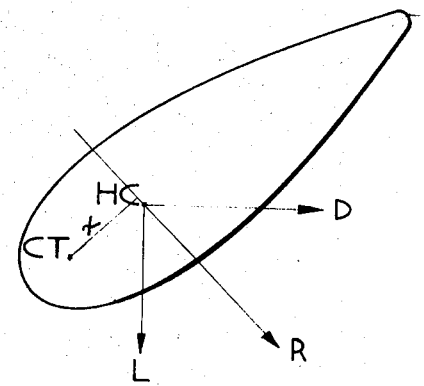
FIG. 4 through FIG. 6 are cross-sectional views of the cable presenting a schematic representation of some of the forces acting on the instant cable.

As shown in FIG. 1 the particular use for which the cable 10 is designed is to tow a submerged object 12 behind some surface towing craft 14. In particular, the submerged object 12 may normally be some type of sonar hydrophone used for underwater surveillance in a naval defense program. The depth at which the object 12 is towed may be on the order of hundreds of feet and consequently the cable lengths involved are considerable. For maximum efficiency of the surveillance operation it is obviously desirable for the surface towing craft 14 to operate at a relatively high speed.

As shown in FIG. 2, which is a cross section of the cable 10 shown in FIG. 1, the cable structure essentially comprises a leading edge portion 16, which is engaged with a trailing edge portion 18. The trailing edge portion 18 is provided with passageways 20 for receiving communications and power cables or conduits 22. It should be understood that the control cables or conduits 22 do not contribute to the structural design of the overall towing cable, but merely provide electrical contact between the towed object 12 and the towing craft 14.

Figure 5:
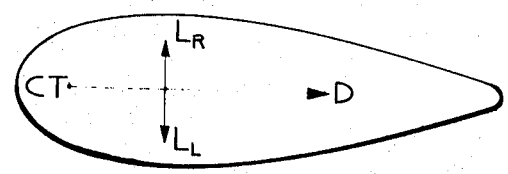
Figure 6:
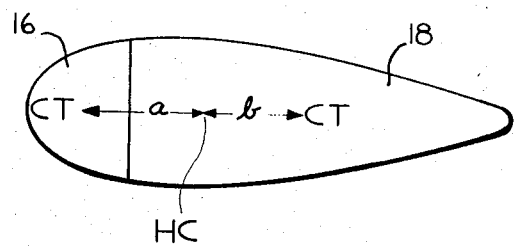

The construction details of the cable 10 of the present invention can be best understood from the cross-sectional schematic view of the same afforded by FIGS. 4, 5 and 6.

As stated before, an ideal faired towline system for high speed towing at significant depths must possess minimum drag by virtue of a small frontal area, noncavitating, nonventilating, hydrodynamically efficient hydrofoil-shaped fairing enclosing a high strength (and therefore, small) tension member. The fairing must be continuous with no joints, fasteners, or segmentation which would increase drag and noise. The trailing edge must be sharp to minimize drag and noise. Stability of the system while being towed must be assured by maintaining the center of tension (C.T.) forward of the hydrodynamic center (H.C.) of the hydrofoil. The C.T. is the centroid of the tension field, i.e., the point through which all the tension forces in the towline are considered to act. The H.C. is the point through which all the lift and drag forces act and is usually located about 1/4 the length of the chord behind the leading edge or at the "(1/4)-chord" point.

In practice the C.T. usually very nearly coincides with the center of rotation which is the point about which the foil will rotate when acted upon by lift and drag forces. Therefore, if the center of rotation and consequently the C.T. can be maintained forward of the (1/4)-chord point (or H.C.), the foil will be stable. For example, assume the towline to be moving in the direction shown in FIG. 4 when it is suddenly displaced at an angle $\theta$ with respect to the direction of motion. The lift force L and the drag force D combine to form the resultant R which acts through the H.C. forming a moment Rx which restores the foil to the direction shown in FIG. 5 in which the lift forces are zero and the drag force acts through both the (C.T.) and the (H.C.).

The location of the center of tension and therefore the center of rotation depends upon the product of the modulus of elasticity (E) of the various materials in the towline and the cross-sectional area (A) of each material, each considered acting through the centroid or C.T. of each area. Thus in FIG. 6 consider the product EA of the leading edge portion acting at a distance $(a)$ forward of the H.C. to be equal to the product EA of the trailing edge acting at a distance $(b)$ aft of the H.C. If $(b)$ is equal to or larger than $(a)$, the center of tension (rotation) of the foil is at or aft of the H.C. and the foil will be unstable.

Additionally, as the towline moves through the water it assumes a near-catenary shape as shown in FIG. 1 with the trailing edge being stressed more than the leading edge. This has the effect of moving the C.T. of the trailing edge portion of the foil aft and if the C.T. coincides with the H.C. or moves aft of it, the foil will become unstable and flip to one side.

It is therefore desirable that the leading edge zone of the streamlined towline cross section be used as the tension member with as high a modulus of elasticity as practical.

The design described herein and illustrated by FIGS. 2, 4, 5, and 6 provides a high-strength, high-modulus tension member whose C.T. is well forward of the foil H.C. and faired by an assembly of materials all of which contribute minimally towards moving the foil C.T. near the H.C. The described design additionally provides a towline which is significantly smaller than previous designs for the same load carrying capability, which results in substantially reduced drag. Also, the described design provides a simplified towline with no moving parts.

The tension member or leading edge 16, FIG. 2, is made of a fiber or filament reinforced composite in which the filaments are essentially unidirectional with their axes parallel to the length of the towline. That is, the filaments are not plied and twisted as in a conventional rope or steel cable. This provides maximum strength and stiffness. Fibers could include any material, such as those of glass, graphite, boron, metal, and polymeric materials. The matrix material used to bind the fibers into a composite can be a polymeric material such as an epoxy or a metal. The tension member may take any convenient shape; however, the shape and location shown will provide the farthest forward C.T.

Immediately aft of the tension member or leading edge 16 is the fairing 18. The fairing material is a low modulus of elasticity material, such as an elastomer which is either solid or foamed. The elastomer must be of such a formulation that its modulus of elasticity will not increase at low temperatures to an extent that the foil C.T. is moved aft to the H.C. or beyond.

A covering 30 is provided for toughness and abrasion protection to the tension member and fairing and to aid in holding leading edge 16 and trailing edge 18 together. Since the cover material 30 must contribute as little additional stiffness to the fairing as possible, it is desirable to construct it of a flexible material. In the instance described it was made of an elastomer impregnated fabric. The elastomer used was the same one used in the fairing and the bidirectional fabric chosen was woven of an organic fiber (Dacron), which is water and abrasion resistant. In order to further reduce the elastic modulus in the direction parallel to the length of the towline, the fabric in the covering was oriented with the fibers at 45° to the length as shown in FIG. 3. The ± 45° orientation also permits the towline to assume the near-catenary shown in FIG. 4 with a minimum tendency to move the foil C.T. aft to or beyond the H.C. The fabric could also be of knit construction, which would achieve the same objective.

Electrical power and signals are transmitted to and from the towed object by means of electrical conductors. Since some tension member-fairing combinations will elongate during normal towing well beyond the yield point of a solid metal conductor, early fatigue failures of the conductor would occur. Such would be the case with an epoxy/fiberglass tension member which is capable of working about 1 percent strain whereas the elastic limit of copper wire is on the order of 1/2 percent.

Therefore, the towline is provided with braided wire conductors 22 to permit greater stretch of the conductor without inducing permanent strain in the wire. The braided construction also contributes less tension force during towing and therefore tends less to move the foil C.T. aft. It is for this reason that the conductors are placed as near the tension member as possible.

The braided construction also applies to coaxial conductors in which the center conductor as well as any conducting outer jacket or sheath are braided.

The towline 10 may be assembled by bonding premolded or premanufactured parts with an adhesive or it may be assembled in the following manner.

A strength member 16 is first molded to the proper cross section and length by any convenient process. The fairing 18 is preformed or extruded from uncured elastomer to approximately the final shape. It is slit and the electrical conductors 22 are inserted. The covering 30 is impregnated with uncured elastomer and cut to the desired size. All pieces are then assembled and the elastomer materials molded to shape and cured with the tension member and conductors in place. The elastomer flows, wets all the surfaces and adhesively bonds all the parts together.

Although the above method has been proven in practice, it is conceivable that improvement in bond strength may be necessary if different materials were chosen. Therefore, the process could include incorporation of adhesives and/or primers applied to one or more of the pieces prior to molding. This, of course, would be necessary if both the tension member 16 and fairing 18 were premolded and cured, since a bond between the two lends ruggedness to the assembly.

It should be understood that although the invention has been described in the form of one particular embodiment, it should not be limited thereto for modifications and changes could be made by one skilled in the art without departing from the spirit and scope of this invention as defined in the following claims.

What is claimed is:

1. A low-drag, high-speed towing cable for towing submerged objects comprising:

a. an elongated leading edge member and an elongated trailing edge member assembled continuously along a plane parallel to said towing cable elongate dimension to form an overall constant hydrofoil cross-sectional shape,
b. said leading edge member is a composite material including a resin with high tensile strength fibers running continuously parallel to said elongate dimension,
c. said trailing edge made from a material having substantial flexibility and provided with an elongated cavity adapted to accommodate conductors or the like,
d. said cavity located adjacent said leading edge plane and extending along an axis parallel therewith, and
e. an enclosing material forming a skin about said assembled leading and trailing edges.

2. A low-drag, high-speed towing cable for towing submerged objects as claimed in claim 1 wherein said hydrofoil shape is symmetrical and said hydrodynamic center is located at about one-quarter of said hydrofoil chord.

3. A low-drag, high-speed towing cable for towing submerged objects as claimed in claim 2 wherein said skin comprises a water and abrasion resistant material formed from a fabric having cross-woven fibers disposed substantially 45° in reference to said cable length.

4. A low-drag, high-speed towing cable for towing submerged objects as claimed in claim 3 wherein said material is impregnated with an elastomer.

5. A low-drag, high-speed towing cable for towing submerged objects as claimed in claim 4 wherein said leading edge member high-tensile fiber material comprises an epoxy-fiberglass.

6. A low-drag, high-speed towing cable for towing submerged objects as claimed in claim 5 wherein said cavity located adjacent said leading edge plane carries braided electrical conductors.

7. A low-drag, high-speed towing cable for towing submerged objects as claimed in claim 6 wherein said leading edge is bonded onto said trailing edge along said plane.

8. A low-drag, high-speed towing cable for towing submerged objects as claimed in claim 7 wherein said cavity is located between said leading edge center of tension and said towing cable cross-sectional hydrofoil-shaped hydrodynamic center.